US008518251B2

(12) United States Patent
Greiner

(10) Patent No.: US 8,518,251 B2
(45) Date of Patent: Aug. 27, 2013

(54) STRAINER DEVICE

(75) Inventor: Ulrich Greiner, Neu-Ulm (DE)

(73) Assignee: Moha Moderne Haushaltwaren AG, Vernier (CH)

( * ) Notice: Subject to any disclaimer, the term of this patent is extended or adjusted under 35 U.S.C. 154(b) by 198 days.

(21) Appl. No.: 13/103,517

(22) Filed: May 9, 2011

(65) Prior Publication Data
US 2011/0272339 A1 Nov. 10, 2011

(30) Foreign Application Priority Data

May 10, 2010 (CH) .......................... 717/10

(51) Int. Cl.
B01D 29/00 (2006.01)
B01D 35/00 (2006.01)
B01D 35/02 (2006.01)

(52) U.S. Cl.
USPC ........... 210/246; 210/232; 210/237; 210/238; 210/464; 210/465; 210/466; 210/469

(58) Field of Classification Search
USPC .......................... 210/464, 465, 466, 469, 246
See application file for complete search history.

(56) References Cited

U.S. PATENT DOCUMENTS

| 160,163 | A | * | 2/1875 | Colgrove | ....................... 292/241 |
| 2,463,209 | A | * | 3/1949 | Serkes | ........................... 210/469 |
| 2,511,111 | A | * | 6/1950 | Jakubowski | .................. 210/466 |
| 2,808,938 | A | * | 10/1957 | Glover | ........................... 210/469 |
| 3,240,348 | A | * | 3/1966 | Serio | ............................. 210/469 |
| 5,505,850 | A | | 4/1996 | Licari | |
| 6,039,887 | A | | 3/2000 | Licari | |
| 6,789,683 | B1 | | 9/2004 | Fisher | |
| 7,798,372 | B2 | * | 9/2010 | Archer, Jr. | ............... 222/189.07 |
| 7,802,702 | B2 | * | 9/2010 | Archer, Jr. | ............... 222/189.07 |

FOREIGN PATENT DOCUMENTS

| DE | 7730940 U1 | 1/1978 |
| DE | 8231777 U1 | 3/1983 |
| WO | 96/10941 A2 | 4/1996 |

* cited by examiner

Primary Examiner — Benjamin Kurtz
(74) Attorney, Agent, or Firm — Fleit Gibbons Gutman Bongini Bianco PL; Marty Fleit; Paul D. Bianco

(57) ABSTRACT

A strainer device (1) is described, which may be mounted on a pour-out of a container by way of fastening means (12) on a lower side (14) which may face the container (3). The strainer device (1) comprises a plurality of sieve elements (10) which are pivotably arranged on a sieve element holder (15) in a plane parallel to the lower side (14) of the strainer device (1), at least partly separated from one another by way of slots (11). As a whole a flexible, bendable comb-like strainer device (1) is formed, which is may be fastened with a fixation device (2) on the pour-out of the container in a simply releasable manner. The strainer device (1) is preferably designed of a heat-resistant plastic, wherein stainless steel may also be applied completely or partly for the design of the sieve elements (10) and/or the sieve element holder (15).

10 Claims, 3 Drawing Sheets

STRAINER DEVICE

TECHNICAL FIELD

The present invention describes a strainer device which may be mounted on a pour-out of a container and which on a lower side able to face the container comprises fastening means designed such that they may be actively connected to a pour-out edge of differently large containers.

STATE OF THE ART

Strainer devices, preferably for cooking vessels, have been known for some time and are available in the most varied of forms. Foodstuffs which are located in fluid may be separated from the fluid by way of the strainer device, wherein the foodstuff is held back in the sieve-like strainer device.

In order to prevent scalding, one must ensure that the strainer device does not slip from the container during the emptying. In order to achieve this, one has introduced a strainer device as disclosed in DE8231777, wherein the strainer device is integrated in the lid of a pot in a fixed manner and is closed in a flap-like manner with a part of the lid.

The strainer device known from EP0785743 takes a different approach and this discloses a strainer device in the form of a bellied, rigid sieve which may be placed on a plane surface, so that the solid matter/fluid mixture may be filled into the bellied sieve. The fluid to be strained may leave the sieve through a plurality of openings, so that the solid foodstuff remains in the sieve for further use. With the use of a strainer device according to EP0785743, the strained fluid as a rule should not and cannot be used any further, since this usually escapes out of the sieve into the sink. It would be conceivable to place the sieve into a larger container and to strain the solid matter/fluid mixture through the sieve within the container. The strained solid matter must be led out of the sieve into a further container or back into the emptied pot after the straining procedure. This procedural manner is thus extremely impractical, since the strained product may not be strained without remaining in the initial container.

A further strainer device according to U.S. Pat. No. 6,789,683 for cooking pots of camping cookers may be placed onto a plurality of differently large pots and may be secured by way of holding means before the straining. The fluid may be strained out of the pot through recesses in the strainer device, wherein the pour-out edge of the container is partly mounted in an annular groove in the strainer device, said groove being provided for this. Since the described strainer device covers the complete pour-out, this strainer device is designed accordingly large. The described fastening of the strainer device with a loop which runs completely around the container and which may be fastened in different manner, is not practical and may only be used for certain pots.

The German utility model DE7730940 devices a strainer device, in particular for cooking vessels, which is designed in a lid-like manner, comprises a plurality of openings and may be placed on a pour-out of a container and may be releasably fastened there. The strainer device may be hooked into a pour-out edge of the pour-out by way of hook elements at the side of the strainer device which faces the pour-out, wherein a fixation element accomplishes the mounting on the pour-out edge against a spring tension. This strainer device may be applied with several pots of different circumference, wherein the hooks are correspondingly hooked into the pour-out edge. The stable strainer device has unchangeable openings and must be fastened on the pour-out of the container by way of springs, in a manner such that the fluid to be strained may pass the openings without the strainer device or the fixation element being released. If the cooking pot with regard to diameter is larger than the diameter of the edge region of the strainer device, then this is held only at the corners. If the diameter of the pour-out is significantly smaller than the diameter of the edge region of the strainer device, then this device is then only held in an almost point-like manner. With a frequent use, it is possible for the moving parts to suffer and for the spring force to weaken, by which means the fastening possibility is no longer sufficient.

DESCRIPTION OF THE INVENTION

It is the object of the present invention, to provide a strainer device or a pour-out sieve, which may be adapted in a simplified manner to containers of different pour-out diameters, in order thus to achieve an improved retention with different diameter sizes of containers. A reproducible, releasable fastening of the strainer device on the pour-out may be achieved, wherein the strainer device automatically adapts to the pour-out periphery during the fastening. With the use of a fixation device for fastening the strainer device, one may make do without components which move to one another and which are on the strainer device and, as the case may be, on the fixation device, for fastening the strainer device on the pour-out edge of the container. The strained product may remain in the container during the straining by way of the strainer device.

BRIEF DESCRIPTION OF THE DRAWINGS

A preferred embodiment example of the subject matter of the invention is described hereinafter in combination with the attached drawings.

DESCRIPTION

Figure 1A:
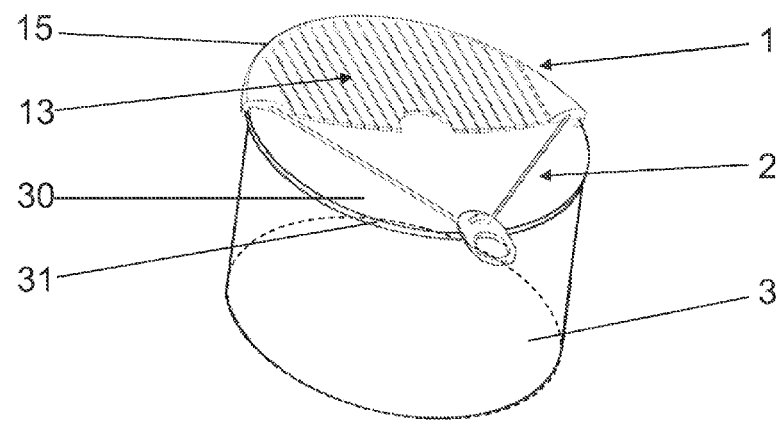
FIG. 1a shows a perspective view of a strainer device placed by way of example on a container, whilst

The strainer device 1 which is described here may be fastened on a pour-out 30 of a container 3. The strainer device 1 in the position of use has an upper side 13 which is away from the container 3, and a lower side 14 which faces the container 3. Fastening means 12 are integrally formed or fastened on the lower side 14 and serve for the retention on the pour-out edge 31 of the container 3. The container 3 may in particular be a saucepan, a pan or a bowl.

The strainer device 1 may be held on the pour-out 30 in a releasable manner by way of an optional fixation device 2. If no fixation device 2 is used, the user must hold the strainer device 1 with one hand for securing its position. For this, one may also provide additional holding means on the upper side 13, which simplifies the holding.

The strainer device 1 comprises an elastically deformable sieve element holder 15 with a plurality of sieve elements 10. Each sieve element 10 is separated from the adjacent sieve elements by way of slots 11, so that the sieve elements 10 are arranged pointing away from the sieve element holder 15 and distanced to one another, and as a whole a comb-like strainer device 1 is formed.

The embodiment of the strainer device 1 which is shown here is designed as a segment of a circle, wherein the fastening means 12 are provided at least approximately along a circular arc and in a cooperating manner engage into the pour-out edge 31, by which means the strainer device 1 is releasably fastened on the pour-out edge 31. The design of the strainer device 1 as a circular segment is however not compelling. What is important is the fact that the fastening means 12 are arranged in a manner such that they may cooperate with the pour-out edge 31, wherein the sieve elements 10 may also project beyond the pour-out 30.

The fastening means 12 are provided in the region of the sieve element holder 15 on the lower side 14 of the strainer device 1. The fastening means 12 are preferably arranged running along the sieve element holder 15 on the lower side 14, so that the fastening means 12 may engage into the pour-out edge 31 of the container 3. The fastening means 12 may thereby either be connected to the strainer device 1 in a fixed integrally formed manner or in a releasable or non-releasable manner. One may selectively fasten an individual fastening means 12 in a peripheral manner on the entire outer periphery of the strainer device 1. The fastening means 12 are preferably designed in the form of hooks which may hook into the pour-out edge 31.

The sieve elements 10 may either be integrally formed on the sieve element holder 15 in a fixed manner or may be releasably or unreleasably connected to the sieve element holder 15. In any case, one however envisages the sieve elements 10 being pivotably arranged on the sieve element holder 15 in a manner in which they are at least partly distanced to one another, so that the sieve elements 10 are movable in a flexible manner in a plane parallel to the surface of the strainer device 1. A use of the strainer device 1 on containers 3 of different pour-out sizes is possible by way of this flexible design, wherein variable slots 11 may be formed, which widen depending on the size of the pour-out 30. With this, differently large containers 3 may at least partly be spanned from an initial condition with a minimal slot size.

One may achieve such a desired flexibility if the sieve elements 10 and the sieve element holder 15 are manufactured of plastic or metal. Selectively, one may however also manufacture the sieve element holder 15 of metal and the plurality of sieve elements 10 of a plastic or also accordingly the other way round. A strainer device 1 with a flexible circular arc and variable slot sizes may be achieved on account of the flexible arrangement of the individual sieve elements 10.

Figure 3:
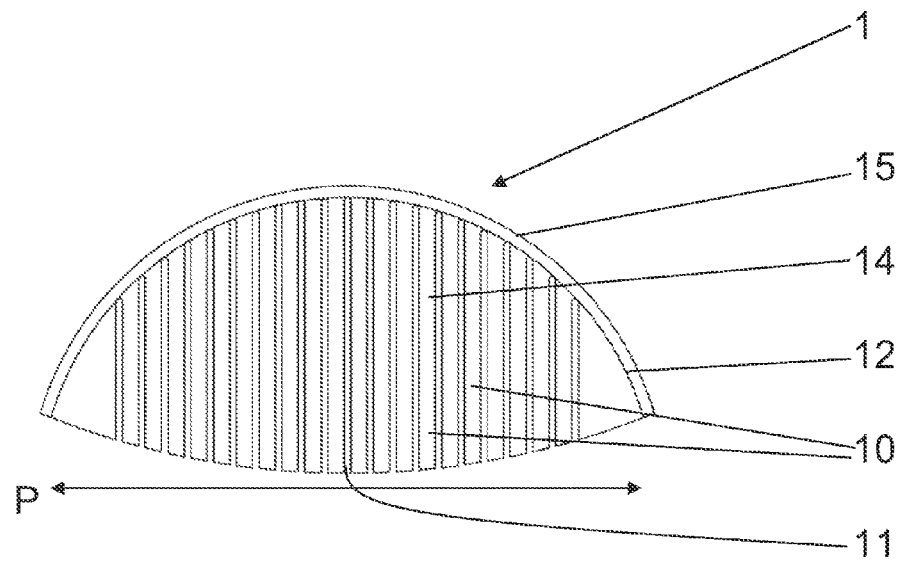
FIG. 3 shows a view from below onto a strainer device in the initial position without fixation device, wherein the sieve element holder lies in the region of the outer periphery of the strainer device, whilst

The comb-like strainer device 1, after placing onto the pour-out edge 31, is widened from a basic condition (as is shown in FIG. 3), depending on which diameter or periphery the pour-out 30 has. The slots 11 thereby are enlarged in the direction away from the sieve element holder 15 to the centre of the pour-out 30 and the sieve elements 10 are spread out in a fan-like manner.

A maximal pour-out size and thus a maximal achievable slot size may not be exceeded, so that the foodstuff located in the fluid to be strained may not escape through the strainer device 1 in an unintended manner with this fluid.

The comb-like strainer device 1 may be adapted within a defined scope to different pour-out sizes of different containers 3. The fixation device 2 is provided for the releasable fastening of the strainer device 1 on the pour-out 30. The user may thereby hold the container 3 with both hands and carry out the straining procedure.

A fixation means 20 is spanned over the middle of the container up to the pour-out edge of the pour-out 30 which lies diametrically opposite the fastening means 12, by way of a grip 21. Fixation hook-in means 22 which are located on the side of the grip 21 which faces the container 3 are then releasably fastened in a hooking manner on the pour-out edge 31. Elastic bands and preferably rubber cords, for example of silicon rubber, are applied as fixation means 20. The grip 21 may be manufactured of metal or plastic.

The strainer device 1 may however also be held by the user with one hand on the pour-out edge 31, whilst the fluid poured out of the container 3. In this case, the fixation device 2 is not necessary and the strainer device 1 is fixed in position by the fastening means 12 and one hand of the user.

Figure 1B:
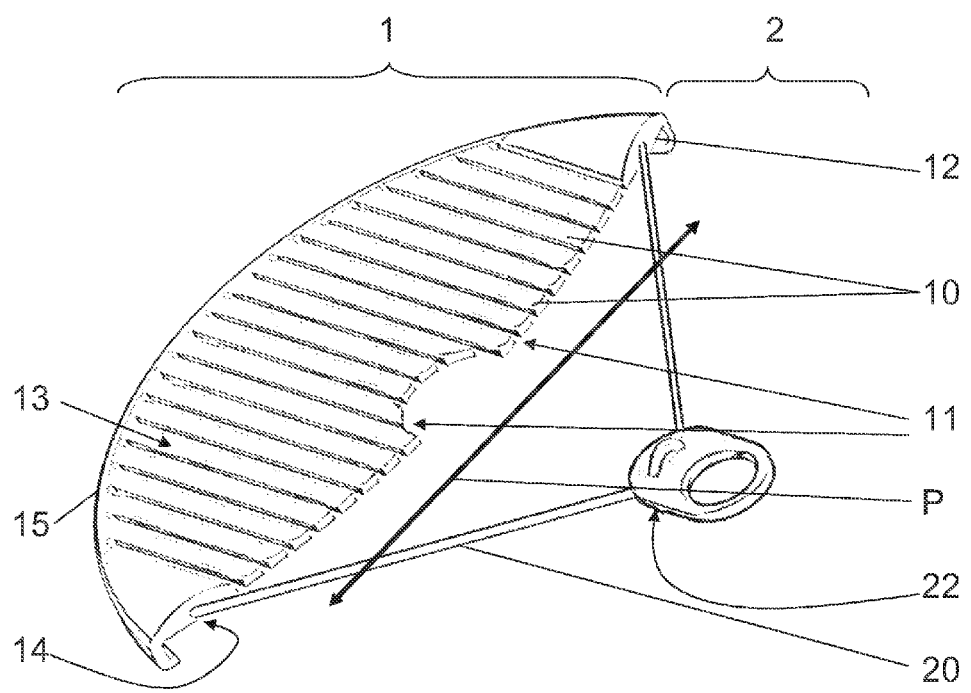
FIG. 1b shows the strainer device in an enlarged, perspective view, on its own.
Figure 2:
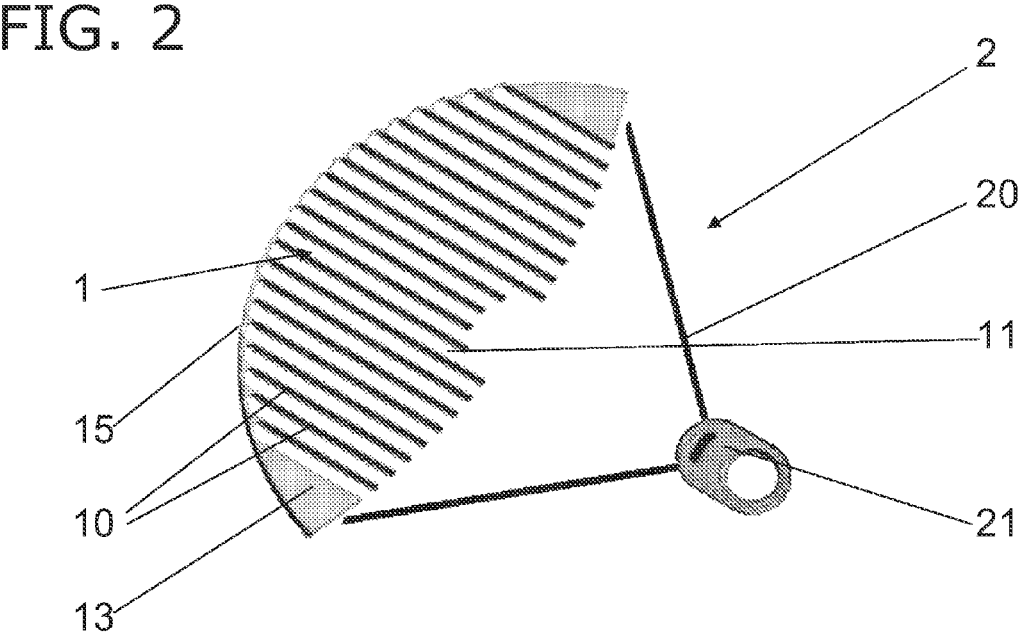
FIG. 2 shows a plan view of a strainer device which is manufactured completely of plastic.

The sieve element holders 15 which are shown in the FIGS. 1a, 1b and 2 are arranged on the side of the strainer device 1 which faces the pour-out edge 31, so that a spreading of the sieve elements 10 may be effected according to the arrow P in FIG. 1b.

Figure 4:
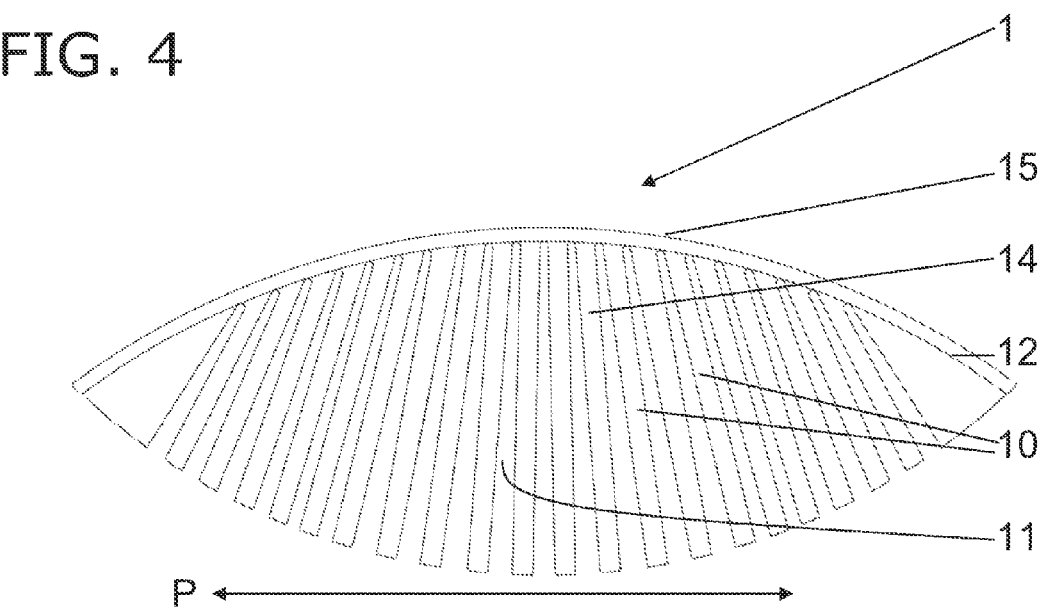
FIG. 4 shows a view from below onto the strainer device in the widened condition.

The spreading occurs from the pour-out edge 31 in the direction of the middle of the container, wherein the slots 11 accordingly have larger slot sizes distanced to the outer periphery of the strainer device 1. A strainer device 1 in the spread condition with a spreading is represented in FIG. 4.

The fastening means 12 on the lower side 14 of the strainer device 1 are preferably designed in a hook-like manner, so that the fastening means 12 cooperate with the pour-out edge 31 in a manner engaging below the pour-out edge 31. In FIG. 1b and FIG. 3, the fastening means 12 is represented arranged running as one piece in the region of the sieve element holder 15 along the outer periphery of the strainer device 1. With this, the fastening means 12 and the sieve element holder 15 are arranged lying opposite the free ends of the sieve elements 10.

The parts which come into contact with the hot fluids and/or the hot container 3, for example the sieve elements 10, the sieve element holder 15 or the grip 21, should be manufactured of heat-resistant plastics, for example polypropylene (PP), silicone or acrylonitrile butadiene styrene copolymerisate (ABS).

The container 3 may be a cooking vessel, for example a pan or a saucepan for separating the cooked product and hot fluid such as water or fat. The device according to the invention may also be placed onto containers 3 such as tins or cans of foodstuffs or plastics containers, wherein foodstuffs stored in a fluid, for example peaches, sweetcorn and other solid matter, may be separated from the fluid by way of the foodstuffs being held back by the strainer device 1 in the container 3, whilst the fluid is poured out.

| List of reference numerals | | |
|---|---|---|
| 1 | | strainer device |
| | 10 | sieve element |
| | 11 | slot |
| | 12 | fastening means |
| | 13 | upper sides (away from the container) |
| | 14 | lower side (facing the container) |
| | 15 | sieve element holder |
| 2 | | fixation device |
| | 20 | fixation means |
| | 21 | grip |
| | 22 | fixation hook-in means |
| 3 | | container |
| | 30 | pour-out |
| | 31 | pour-out edge |
| P | | spreading direction. |

The invention claimed is:

1. A strainer device mountable on a pour-out of a container and which comprises fastening means on a lower side, said fastening means being designed such that said fastening means may be actively connected to a pour-out edge of differently large containers, wherein the strainer device comprises a plurality of sieve elements arranged on an elastically deformable sieve element holder in a manner at least partly separated from one another by way of slots, so that a comb-like strainer device may be formed with at least some of the plurality of sieve elements movable in a plane parallel to the lower side.

2. A strainer device according to claim 1, wherein the plurality of sieve elements is fastened in a releasable or non-releasable manner on the sieve element holder or is integrally formed on the sieve element holder.

3. A strainer device according to claim 1, wherein the sieve element holder at least approximately runs along an outer periphery of the strainer device, is elastically stretchable in a plane and is actively connected to the pour-out edge by way of the fastening means.

4. A strainer device according to claim 1, wherein the fastening means in the region of the outer periphery of the strainer device is arranged on the lower side of the strainer device.

5. A strainer device according to claim 4, wherein the fastening means is arranged along a circular arc.

6. A strainer device according to claim 1, wherein the sieve element holder is manufactured of a sheet-steel part or of a heat-resistant plastic.

7. A strainer device according to claim 1, wherein the sieve elements are manufactured of at least one of sheet-steel part and of a heat-resistant plastic.

8. A strainer device according to claim 1, wherein the strainer device is provided with a fixation device, wherein the strainer device is releasably fastenable on the pour-out by way of fixation means and fixation hook-in means actively connected to the pour-out edge.

9. A strainer device according to claim 8, wherein the fixation means are elastic bands.

10. A strainer device according to claim 8, wherein the fixation means are connected to a grip.

\* \* \* \* \*